(12) United States Patent
Balchaytis

(10) Patent No.: US 8,061,623 B2
(45) Date of Patent: Nov. 22, 2011

(54) PLASTIC CARD PROVIDED WITH ELECTRICAL CONTACTS

(76) Inventor: Vadim Evgenevich Balchaytis, Omsk (RU)

( * ) Notice: Subject to any disclaimer, the term of this patent is extended or adjusted under 35 U.S.C. 154(b) by 564 days.

(21) Appl. No.: 12/184,534

(22) Filed: Aug. 1, 2008

(65) Prior Publication Data

US 2008/0299788 A1     Dec. 4, 2008

Related U.S. Application Data

(63) Continuation of application No. PCT/RU2006/000418, filed on Aug. 8, 2006.

(30) Foreign Application Priority Data

Feb. 9, 2006    (RU) ................................ 2006103867

(51) Int. Cl.
*G06K 19/05*     (2006.01)
(52) U.S. Cl. ........................................ 235/492; 235/487
(58) Field of Classification Search .................. 235/492, 235/487, 441, 453
See application file for complete search history.

(56) References Cited

U.S. PATENT DOCUMENTS

| | | | |
|---|---|---|---|
| 5,518,416 A | 5/1996 | Kantner et al. | |
| 5,888,624 A | 3/1999 | Haghiri et al. | |
| 6,715,678 B1 | 4/2004 | Sion et al. | |
| 6,748,541 B1 | 6/2004 | Margalit et al. | |
| 6,883,718 B1 | 4/2005 | Le et al. | |
| 7,344,072 B2 * | 3/2008 | Gonzalez et al. | 235/441 |
| 7,377,448 B2 * | 5/2008 | Dan et al. | 235/492 |

FOREIGN PATENT DOCUMENTS

| | | |
|---|---|---|
| EP | 1429283 | 4/2004 |
| EP | 1429283 A2 | 6/2004 |
| WO | 2005124932 | 12/2005 |

* cited by examiner

*Primary Examiner* — Daniel St.Cyr
(74) *Attorney, Agent, or Firm* — Paul & Paul

(57) ABSTRACT

The inventive plastic card (1) is provided with electric contacts (4) and an electric circuit (3) incorporated therein and is embodied in such a way that it is foldable (6) and insertable from the fold side into the plug socket of an external reading device. The reliable application of the card contacts to the plug socket contacts, in particular of an UBS socket, is secured by the fold flexibility and the selection of a number of parallel folds.

11 Claims, 2 Drawing Sheets

PLASTIC CARD PROVIDED WITH ELECTRICAL CONTACTS

TECHNICAL FIELD OF THE INVENTION

The invention relates to storage media devices such as plastic cards having electrical contacts and embedded microcircuits.

TECHNICAL BACKGROUND

A prior art plastic card described in U.S. Pat. No. 6,715,678 of Apr. 6, 2004, which has electrical contacts and an embedded microcircuit, is designed to be inserted into a port of an external reading device. The prior art card (closest prior art of the first embodiment of this invention) is disadvantageous because it requires an intermediate reading device to be inserted into the USB interface of a computer.

Another prior art plastic (memory) card disclosed in U.S. Pat. No. 6,883,718 of Apr. 26, 2005, which has electrical contacts and an embedded microcircuit, is designed to be inserted into the interface socket of an external reading device, in particular, the USB interface of a computer. The prior art memory card (closest prior art of the first embodiment of this invention) is disadvantageous because its portion intended for insertion into a USB interface has a thickness differing from that of the remaining portion of the card, creating inconveniences when the memory card is used, for example, as a visiting card or as a storage card.

Yet another plastic card described in International Application WO 2005/124932 of Dec. 29, 2005, has electrical contacts and an embedded microcircuit and can be folded and inserted in a folded state into the interface socket of an external reading device. The prior art card (closest prior art of the first embodiment of this invention) is disadvantageous because its electrical contacts are not resilient enough when inserted into the interface socket of the external reading device and cannot ensure a reliable contact fit. Another disadvantage of the prior art card is that its applications are restricted by its lateral dimensions, that is, the card cannot be wider than the socket of the matching interface of the external reading device.

The plastic card described in U.S. Pat. No. 6,715,678 of Apr. 6, 2004, has electrical contacts and an embedded microcircuit on one side of the card made in the form of a strip to be inserted into the interface of an external reading device. The card (which is the closest prior art of the second embodiment of this invention) is disadvantageous because it requires an intermediate reading device to be inserted into the USB interface of a computer.

A still further plastic card described in EP No. 1,429,283 of Apr. 6, 2004, has electrical contacts and an embedded microcircuit on one side of the card that is made in the form of a strip to be inserted into the interface socket of an external reading device. The prior art card (closest prior art of the second embodiment of this invention) is disadvantageous because it has a thickness matching a USB port, requiring extra quantities of material and besides it does not conform to the accepted thickness standards of cards used, for example, as visiting cards.

DESCRIPTION OF THE INVENTION

The claimed invention is designed to allow information to be read from plastic cards commonly used for various purposes directly through the interface of an external reading device, and, in particular, through the USB interface of a computer, requiring a medium provided with electrical contacts to be inserted into the interface and having a thickness several times the thickness of the plastic card. As a result, the electrical contacts of the card are pressed firmly against the USB interface contacts by increasing the resilience of the flexible electrical contacts and/or selecting an adequate number of folds of the plastic card to be inserted into the USB interface.

This technical effect is achieved in a plastic card having electrical contacts and an embedded microcircuit and insertable in a folded state into the interface socket of an external reading device. The card itself is provided with a groove or grooves along the fold line, and the electrical contacts are arranged relative to the folding line in a way that allows them to be connected to the contacts of the interface of the external reading device when the card is inserted into the socket thereof from the fold side. To put it differently, the electrical contacts are arranged relative to the fold line so as to be connected to the contacts of the external reading device interface when the card is inserted into the socket thereof from the fold side.

The plastic card can be provided with a coating to prevent its cracking on folding. Coating can be applied in the form of a strip extending along the fold line.

The plastic card can have several parallel folds to be inserted in a multiple-fold state into the interface socket of an external reading device.

The grooves along the fold line can be provided by various methods. The plastic card can have perforations or cuts along the fold line. The plastic card may further be provided with recesses along the fold line.

The above technical effect is achieved in a plastic card having electrical contacts and an embedded microcircuit provided on the card portion that is inserted into the interface socket of an external reading device. The plastic card portion inserted into the interface socket of the external reading device can be provided with a groove or grooves along the fold line, and the electrical contacts are arranged relative to the fold line so as to be connected to the contacts of the external reading device interface when the folded portion of the card is inserted into the socket thereof from the fold side. In other words, the electrical contacts are arranged relative to the fold line in such a way as to be connected to the interface contacts of the external reading device upon insertion into the socket thereof.

The plastic card portion having electrical contacts and an embedded microcircuit can be designed as a strip that can be reshaped into several parallel folds and be inserted, in a multiple-fold state, into the interface socket of an external reading device.

The plastic card portion that is inserted into the interface socket of an external reading device is recessed along the fold line.

The plastic card portion that is inserted into the interface socket of an external reading device can be provided with a coating to prevent its cracking on folding.

PERFORMANCE OF THE INVENTION

Figure 1:
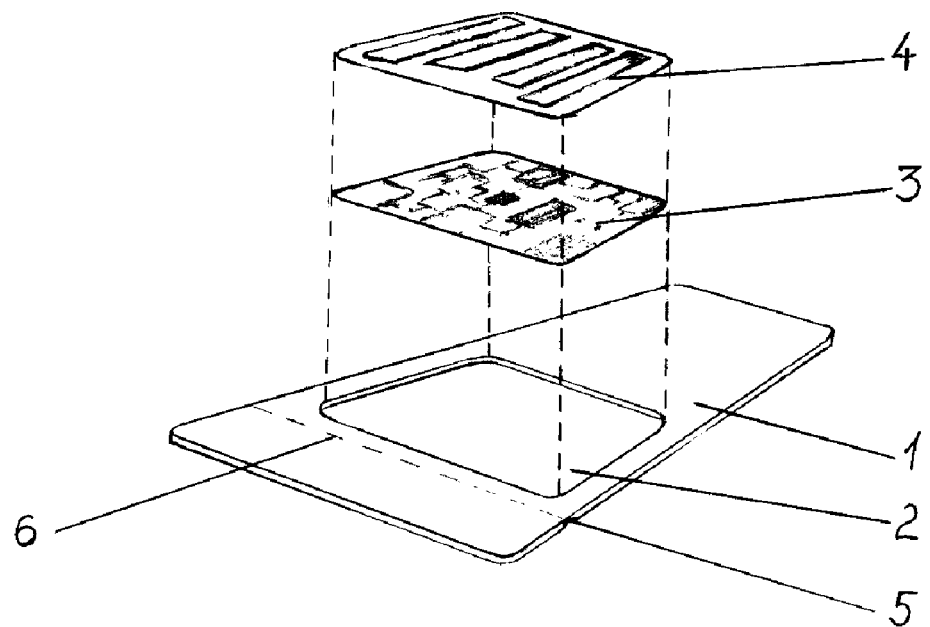
FIG. 1 is a view of the plastic card having electrical contacts and an embedded microcircuit.
Figure 2:
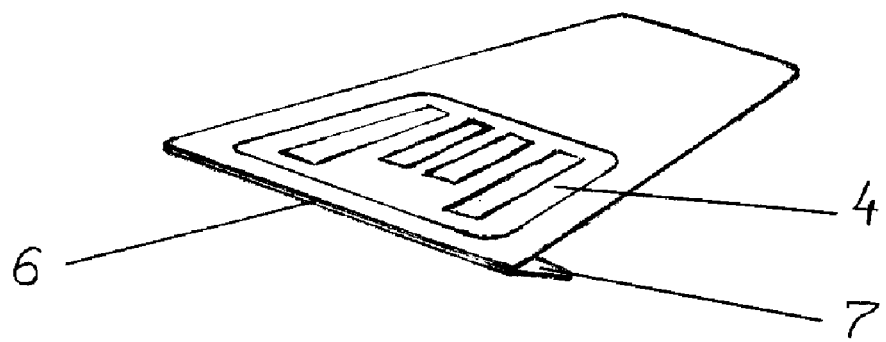
FIG. 2 is a view of the plastic card folded for insertion from the fold side into the socket of a USB interface.

FIG. 1 illustrates a plastic card 1 made of polyvinylchloride and provided with a slot 2 for a microcircuit (chip) 3, in particular, a microprocessor, to be embedded therein. A contact group 4 is placed above the microcircuit. The plastic card has a groove in the form of a recess (cut) 5 on the surface thereof along a fold line 6. As shown in FIG. 2, the plastic card is in a folded state, in which it can be inserted into the socket 5 of a USB interface. Recess 5 defines the position of fold line 6 on the plastic card. For this purpose, too, the recesses can be replaced with several grooves in the form of card perforations along the fold line or cuts on the opposite sides of the card. Contacts 4 are arranged relative to the fold line so that when the plastic card is inserted from the fold side into the socket of the USB interface the contacts are connected to the contacts of the USB interface. In this position, the fold line is pressed against the wall of the socket of the USB interface.

To prevent card cracking along the fold line after multiple insertions into the interface socket, it can be coated with an elastic and tension-resistant material such as polyethylene or polypropylene. The coating can be applied as a strip covering fold line 6.

The plastic card fits into the socket of the USB interface owing to the folded portion 7 (FIG. 2) of the card that provides the required thickness to flexibly press contacts 4 against the contacts of the USB interface. The thickness of the plastic card folded twice or a larger number of times can be selected to provide reliable fitting of its contacts in the interface socket.

Figure 3:
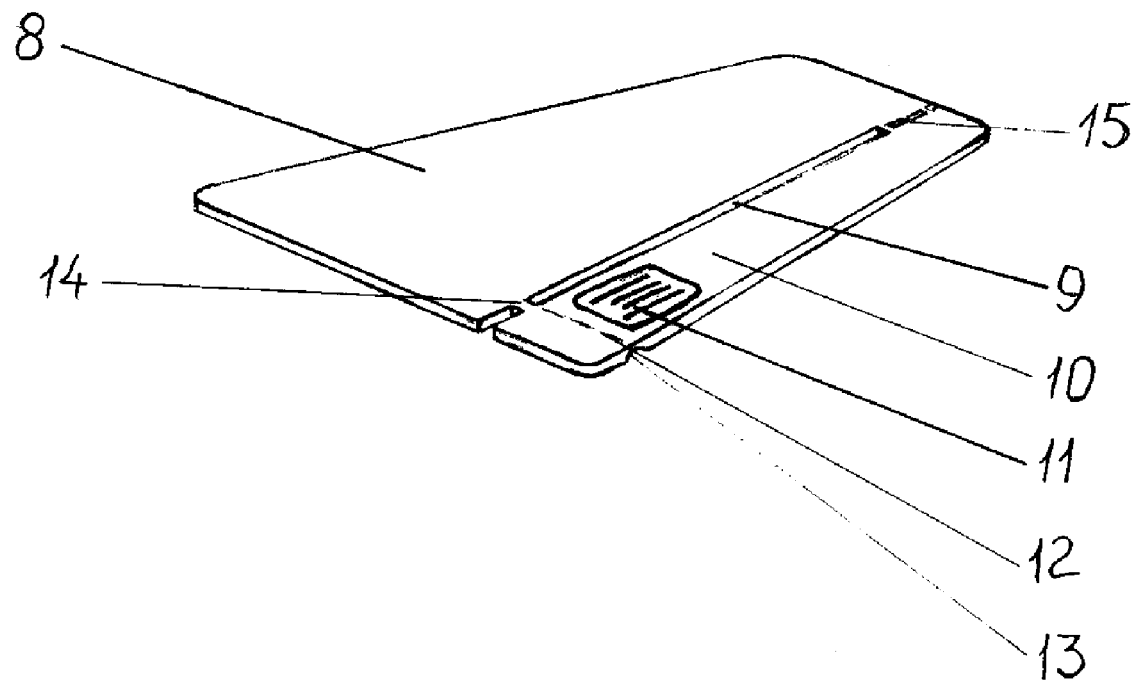
FIG. 3 is a view of the plastic card with a strip folded out for insertion into the socket of a USB interface.

FIG. 3 illustrates a plastic card 8 having a cut 9 separating a portion of the card in the form of a strip 10 provided with electrical contacts 11. Strip 10 insertable into the USB interface can be folded out away from the remaining portion of the card and be folded along a fold line 12 defined by a groove 13. Strip 10 is held in normal position before use by a bridge 14. Strip 10 can be detached from the rest of the card along perforations 15 and be used separately thereafter.

Applications of plastic cards manufactured in accordance with this invention depend on the type of microcircuit embedded therein. Applications such as visiting cards, labels, or insertions in published materials suggest storage and reading of relatively small volumes of information, whereas smart card applications require a microprocessor to be embedded into the card. In both instances, though, this invention allows a card user to rely on an ordinary computer to perform required operations.

What is claimed is:

1. A foldable plastic card having electrical contacts and an embedded microcircuit and insertable in a folded state into the interface socket of an external reading device, wherein the plastic card is provided with a fold line and the electrical contacts thereof are arranged relative to the fold line, characterized in that
the interface socket of the external reading device is the socket of a USB interface and the plastic card is provided with a groove or grooves along the fold line and the electrical contacts are arranged relative to the fold line so as to be connected to the contacts of the USB interface of the external reading device on insertion of a folded portion of the card into the socket of the USB interface from the fold side of the folded portion.

2. A plastic card of claim 1, wherein the plastic card is provided with a coating to protect the plastic card against cracking on folding.

3. A plastic card of claim 2, wherein the coating is applied in the form of a strip along the fold line.

4. A plastic card of claim 1, wherein the plastic card is designed to be reshaped into several parallel folds and be inserted, in a multiple-fold state, into the interface of an external reading device.

5. A plastic card of claim 1, wherein the plastic card is provided with perforations along the fold line.

6. A plastic card of claim 1, wherein the plastic card is provided with cuts along the fold line.

7. A plastic card of claim 1, wherein the plastic card is provided with a recess along the fold line.

8. A plastic card of claim 1, wherein the portion of the plastic card that is insertable into the interface socket of the external reading device is provided with a coating to prevent its cracking on folding.

9. A foldable plastic card having electrical contacts and an embedded microcircuit provided on the portion of the card that is inserted into the socket of the USB interface of an external reading device, wherein the portion of the plastic card that is insertable into the socket of the USB interface of the external reading device is provided with a recess or recesses along the fold line, and the electrical contacts thereof are arranged relative to the fold line to be connected to the contacts of the USB interface of the external reading device on insertion of the folded portion of the card into the socket of the USB interface.

10. A plastic card of claim 9, wherein the portion of the plastic card having the electrical contacts and the embedded microcircuit is a strip that can be reshaped into several parallel folds and inserted, in a multiple-fold state, into the interface socket of the external reading device.

11. A plastic card of claim 9, wherein the portion of the plastic card that is insertable into the interface socket of the external reading device has a recess along the fold line.

* * * * *